(12) United States Patent
Kato

(10) Patent No.: US 9,557,241 B2
(45) Date of Patent: Jan. 31, 2017

(54) WAVEFRONT ABERRATION MEASURING METHOD, WAVEFRONT ABERRATION MEASURING APPARATUS AND OPTICAL ELEMENT MANUFACTURING METHOD

(71) Applicant: CANON KABUSHIKI KAISHA, Tokyo (JP)

(72) Inventor: Seima Kato, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 145 days.

(21) Appl. No.: 14/224,285

(22) Filed: Mar. 25, 2014

(65) Prior Publication Data

US 2014/0293275 A1    Oct. 2, 2014

(30) Foreign Application Priority Data

Mar. 26, 2013   (JP) ................................. 2013-063405

(51) Int. Cl.
  *G01B 9/00*    (2006.01)
  *G01M 11/02*   (2006.01)

(52) U.S. Cl.
  CPC ................................ *G01M 11/0257* (2013.01)

(58) Field of Classification Search
  CPC ....... G03F 9/7069; G01N 21/47; G01N 21/94; G01J 9/00; G01M 11/0257
  USPC ...... 355/52–67; 356/128, 515, 521, 498, 53, 356/124–127
  See application file for complete search history.

(56) References Cited

U.S. PATENT DOCUMENTS 5,898,501 A * 4/1999 Suzuki .................... G03F 7/706
                                                    356/511
7,956,987 B2 * 6/2011 Ohsaki .................... G03F 7/706
                                                    355/67

FOREIGN PATENT DOCUMENTS

JP        2010-151578 A    7/2010

\* cited by examiner

*Primary Examiner* — Tri T Ton
(74) *Attorney, Agent, or Firm* — Rossi, Kimms & McDowell LLP

(57) ABSTRACT

The wavefront aberration measuring method includes measuring an intensity distribution of a measuring light transmitted through or reflected by an object to be measured, by using a light-receiving sensor, calculating a first differential wavefront which is a differential wavefront of the measuring light on the light-receiving sensor, and calculating a second differential wavefront by performing a correction process on the first differential wavefront depending on an incident angle of the measuring light to the light-receiving sensor. The method further includes calculating a wavefront aberration of the object by using the second differential wavefront.

15 Claims, 5 Drawing Sheets

WAVEFRONT ABERRATION MEASURING METHOD, WAVEFRONT ABERRATION MEASURING APPARATUS AND OPTICAL ELEMENT MANUFACTURING METHOD

BACKGROUND OF THE INVENTION

Field of the Invention

The present invention relates to a measuring technique to measure a wavefront aberration of an object to be measured, such as an optical element.

Description of the Related Art

As methods of measuring a wavefront of light transmitted through or reflected by an optical element as an object to be measured (hereinafter simply referred to as "an object"), measuring methods using a Talbot interferometer and a Shack-Hartmann sensor are conventionally known. Calculating a difference between a measurement result obtained by one of these measuring methods and a design value of aberration of the optical element enables measuring a wavefront aberration corresponding to the aberration of the optical element.

Japanese Patent Laid-Open No. 2010-151578 discloses a method of measuring aberration of an object from a difference (that is, a wavefront aberration) between a measured value of a wavefront measured by the Talbot interferometer or the Shack-Hartmann sensor and a value of a reference wavefront. Moreover, it discloses a method of calculating the reference wavefront by using an optical path length calculated by using a reference object whose shape and refractive index distribution are known.

However, the reference wavefront calculated by using the optical path length has, if the wavefront does not have a planar shape, a difference from the measured value of the wavefront measured by the Talbot interferometer or the Shack-Hartmann sensor. This difference can be easily explained, if the wavefront is a spherical wavefront, by using numerical expressions. For example, an optical path length Ws shown in FIG. 10 from a point light source to a sensor surface which is a planar surface can be expressed by following expression (1) where L represents a distance from the point light source to the sensor surface and r represents a distance (radius) from a center of the sensor surface:

$$W_S = \sqrt{L^2 - r^2} - L \sim \frac{r^2}{2L} - \frac{r^4}{8L^3} + \frac{r^6}{16L^5} \quad (1)$$

On the other hand, when measurements of a wavefront of light from a same object by using the Talbot interferometer and the Shack-Hartmann sensor are made, stripes or bright points at equal intervals are measured in both the measurements. Since a differential wavefront which is a differential value of this measured wavefront is a tilted wavefront, the measured wavefront Wm is expressed by the following quadratic function of r (expression (2)):

$$Wm = \frac{r^2}{2L} \quad (2)$$

The optical path length Ws expressed by expression (1) and the measured wavefront Wm expressed by expression (2) coincide with each other only when the distance L is infinite, that is, light from the object is collimated light, and on the other hand have a difference from each other when the distance L is not infinite.

Such a difference is difficult to be expressed by numerical expressions when the measured wavefront is an aspheric surface, so that the difference cannot be easily corrected. Therefore, when calculating the reference wavefront by using the light path length, there may be a case where an accurate difference between the measured wavefront and the reference wavefront cannot be obtained, which is a problem that measurement accuracy of the wavefront aberration decreases.

BRIEF SUMMARY OF THE INVENTION

The present invention provides a wavefront aberration measuring method and a wavefront aberration measuring apparatus each capable of acquiring an accurate wavefront aberration and provides an optical element manufacturing method using the wavefront aberration measuring method.

The present invention provides as an aspect thereof a wavefront aberration measuring method which includes measuring an intensity distribution of a measuring light transmitted through or reflected by an object to be measured, by using a light-receiving sensor, calculating a first differential wavefront which is a differential wavefront of the measuring light on the light-receiving sensor, calculating a second differential wavefront by performing a correction process on the first differential wavefront depending on an incident angle of the measuring light to the light-receiving sensor, and calculating a wavefront aberration of the object by using the second differential wavefront.

The present invention provides as another aspect thereof a wavefront aberration measuring method which includes measuring an intensity distribution of a measuring light transmitted through or reflected by an object to be measured, by using a light-receiving sensor, calculating a measured differential wavefront which is a differential wavefront of the measuring light on the light-receiving sensor, calculating a first reference differential wavefront which is a differential wavefront of a reference light on the light-receiving sensor, the reference light being transmitted through or reflected by a reference object having a reference shape for that of the object, calculating a second reference differential wavefront by performing a correction process on the first reference differential wavefront depending on an incident angle of the reference light to the light-receiving sensor, and calculating a wavefront aberration of the object by using the second reference differential wavefront and the measured differential wavefront.

The present invention provides as still another aspect thereof a manufacturing method of an optical element which includes forming the optical element, measuring an intensity distribution of a measuring light transmitted through or reflected by an object to be measured, by using a light-receiving sensor, calculating a first differential wavefront which is a differential wavefront of the measuring light on the light-receiving sensor, calculating a second differential wavefront by performing a correction process on the first differential wavefront depending on an incident angle of the measuring light to the light-receiving sensor, calculating a wavefront aberration of the object by using the second differential wavefront, and evaluating the optical element by using the wavefront aberration.

The present invention provides as yet still another aspect thereof a manufacturing method of an optical element which includes forming the optical element, measuring an intensity distribution of a measuring light transmitted through or reflected by an object to be measured, by using a light-receiving sensor, calculating a measured differential wavefront which is a differential wavefront of the measuring light on the light-receiving sensor, calculating a first reference differential wavefront which is a differential wavefront of a reference light on the light-receiving sensor, the reference light being transmitted through or reflected by a reference object having a reference shape for that of the object, calculating a second reference differential wavefront by performing a correction process on the first reference differential wavefront depending on an incident angle of the reference light to the light-receiving sensor, calculating a wavefront aberration of the object by using the second reference differential wavefront and the measured differential wavefront, and evaluating the optical element by using the wavefront aberration.

The present invention provides as further another aspect thereof a wavefront aberration measuring apparatus which includes a measurer configured to measure an intensity distribution of a measuring light transmitted through or reflected by an object to be measured, by using a light-receiving sensor, a differential wavefront calculator configured to calculate a first differential wavefront which is a differential wavefront of the measuring light on the light-receiving sensor, a corrector configured to calculate a second differential wavefront by performing a correction process on the first differential wavefront depending on an incident angle of the measuring light to the light-receiving sensor, and a wavefront aberration calculator configured to calculate a wavefront aberration of the object by using the second differential wavefront.

The present invention provides as yet further another aspect thereof a wavefront aberration measuring apparatus which includes a measurer configured to measure an intensity distribution of a measuring light transmitted through or reflected by an object to be measured, by using a light-receiving sensor, a measured differential wavefront calculator configured to calculate a measured differential wavefront which is a differential wavefront of the measuring light on the light-receiving sensor, a reference differential wavefront calculator configured to calculate a first reference differential wavefront which is a differential wavefront of a reference light on the light-receiving sensor, the reference light being transmitted through or reflected by a reference object having a reference shape for that of the object, a corrector configured to calculate a second reference differential wavefront by performing a correction process on the first reference differential wavefront depending on an incident angle of the reference light to the light-receiving sensor, and a wavefront aberration calculator configured to calculate a wavefront aberration of the object by using the second reference differential wavefront and the measured differential wavefront.

Further features of the present invention will become apparent from the following description of exemplary embodiments (with reference to the attached drawings).

DETAILED DESCRIPTION OF THE EMBODIMENTS

Exemplary embodiments of the present invention will be described below with reference to the accompanied drawings.

In the following embodiments, "a measured wavefront" means a wavefront of a measuring light, which is obtained by measuring the measuring light transmitted through or reflected by an object to be measured by using a light-receiving sensor as a wavefront sensor (hereinafter also simply referred to as "a sensor"), by analyzing a signal obtained from the sensor and then by being restored. "The object to be measured" is an optical element (such as a lens) which has an aspheric surface or a spherical surface as a surface to be measured. The object to be measured is hereinafter simply referred to as "an object." On the other hand, "a reference object (to be measured)" is an object having a same shape as that of a designed object (that is, having a shape serving as a reference for that of the object) and whose shape is known. Moreover, "a reference wavefront" means an optical path length distribution which is measured or calculated for a reference light transmitted through or reflected by the reference object placed at a known position. Furthermore, a difference between the measured wavefront and the reference wavefront is referred to as "a wavefront aberration."

Embodiment 1

Figure 1:
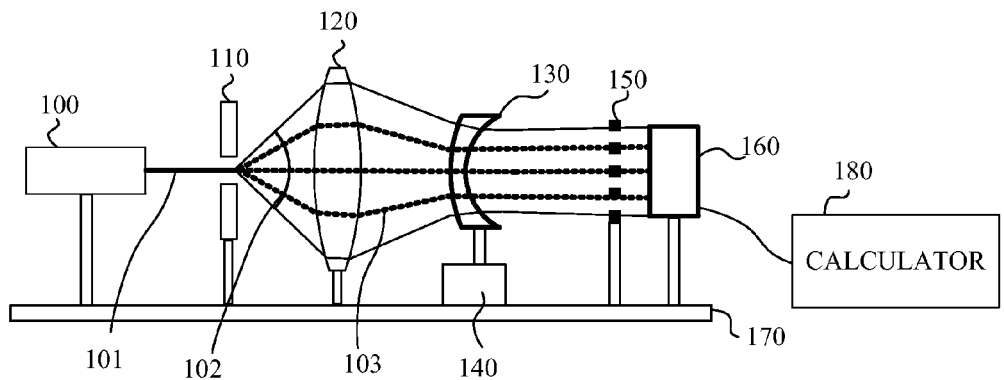
FIG. 1 shows a configuration of a wavefront aberration measuring apparatus that is Embodiment 1 of the present invention.

FIG. 1 shows a configuration of a wavefront aberration measuring apparatus that is a first embodiment (Embodiment 1) of the present invention. The measuring apparatus projects light from a light source 100 to an object 130 and measures a transmitted wavefront which is a wavefront of the light transmitted through the object 130 (hereinafter also referred to as "a transmitted wavefront of the object 130") by a detector 160 including the above-mentioned wavefront sensor. Then, the measuring apparatus calculates, at its calculator 180 constituted by a computer, a wavefront aberration of the object 130 by using a signal from the detector 160. In this embodiment, as a measuring system to measure the transmitted wavefront, a Talbot interferometer is used. The calculator 180 serves as a differential wavefront calculator, a corrector and a wavefront aberration calculator.

A laser beam 101 emitted from a laser, such as a He—Ne laser, as the light source 100 along an optical axis (that is, in an optical axis direction) is diffracted when passing through a pinhole 110. The laser beam (light) 102 diffracted at the pinhole 110 is converted into a convergent light 103 by a collimator lens 120 and is transmitted through the object 130. The light transmitted through the object 130 passes through an orthogonal diffraction grating 150 which is a two-dimensional diffraction grating and is captured (measured) by the detector 160. A diameter φ of the pinhole 110 is small to such an extent that the diffracted light 102 can be regarded as an ideal spherical wave, and the pinhole 110 is designed so as to satisfy following expression (3) where NAO represents an object side numerical aperture and λ represents a wavelength of the laser (light source) 100:

$$\phi \approx \frac{\lambda}{NAO} \qquad (3)$$

When the wavelength λ is 600 nm and the object side numerical aperture NAO is approximately 0.3, it is sufficient that the diameter φ of the pinhole 110 is approximately 2 μm. Instead of the pinhole 110, a fiber exit end may be used. When an image side numerical aperture of the object 130 is small, a distance Z between the diffraction grating 150 and the detector 160 (the distance Z is hereinafter referred to as "a Talbot distance") satisfies a Talbot condition shown by following expression (4) provides a Talbot subimage of the diffraction grating 150 as interference fringes on the detector 160.

$$\frac{Z_0 Z}{Z_0 - Z} = \frac{mp^2}{\lambda} \qquad (4)$$

In expression (4), m represents an integer except 0, p represents a pitch (grating pitch) of the diffraction grating 150, $Z_0$ represents a distance between the diffraction grating 150 and a focusing position of light entering the diffraction grating 150. The grating pitch p of the diffraction grating 150 is decided depending on an amount of aberration of the object 130.

The object 130 is placed on a parallel eccentric mechanism 140 and is movable in the optical axis direction and directions orthogonal to the optical axis direction by the parallel eccentric mechanism 140. The collimator lens 120, the diffraction grating 150 and the detector 160 (parallel eccentric mechanism 140) are relatively movable with respect to each other on a rail provided on an anti-vibration table 170 and extending in the optical axis direction.

In the measurement of the transmitted wavefront of the object 130, the calculator 180 calculates an optimal arrangement of the object 130, the diffraction grating 150 and the detector 160 on a basis of a refractive power of the object 130. The object 130, the diffraction grating 150 and detector 160 are moved to positions corresponding to the calculated arrangement. The object 130 is moved on the parallel eccentric mechanism 140, and the diffraction grating 150 and the detector 160 are moved on the above-mentioned rail. The optimal arrangement herein is an arrangement in which the light (light flux) transmitted through the object 130 is focused in the detector 160 and a numerical aperture NA of the light flux becomes small.

Although FIG. 1 shows the case where the object 130 is a concave lens, when the object 130 is a convex lens, the object 130 should be located on a detector side further than a focusing point of the collimator lens 120 such that a divergent light enters the object 130. Deciding the optimal arrangement of the object 130, the diffraction grating 150 and the detector 160 (these are hereinafter referred to as "elements") by the calculator 180 and the locating the elements to the optimal arrangement are also collectively referred to as "arrangement adjustment."

Figure 2:
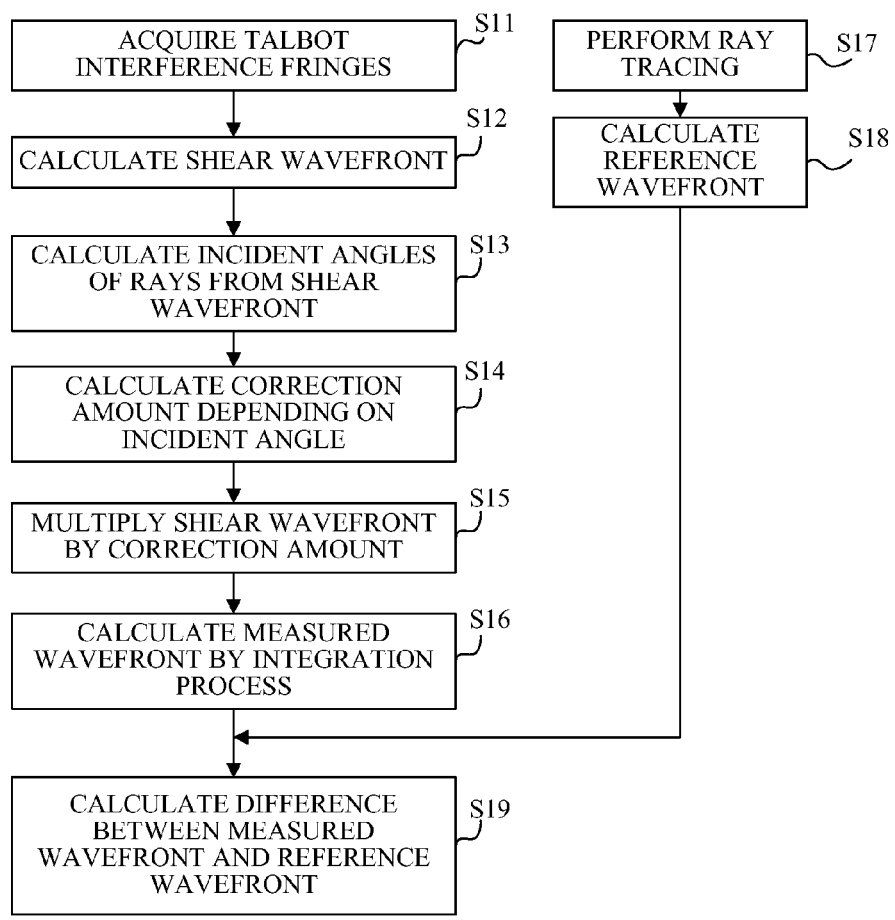
FIG. 2 is a flowchart showing a procedure to calculate a wavefront aberration in Embodiment 1.

FIG. 2 shows a procedure of a process (wavefront aberration measuring method) to calculate the wavefront aberration of the object 130 by using an image captured by the detector 160. This calculation process is performed by the calculator (computer) 180 shown in FIG. 1 according to a computer program.

The calculator 180 calculates a measured wavefront at steps S11-S16 and calculates a reference wavefront at steps S17 and S18. Either the measured wavefront or the reference wavefront may be calculated first.

First, description will be made of the calculation of the reference wavefront. In this embodiment, the reference wavefront is calculated by using ray tracing. Initially, the shape and location of the reference object are set, and locations identical to those of the elements (including the reference object in place of the object 130) in the measuring apparatus shown in FIG. 1 are input to the calculator 180. At step S17, the calculator 180 performs the ray tracing for a plurality of optical paths of the reference light (rays) exiting from the pinhole 110 and reaching a light-receiving surface (hereinafter referred to as "a sensor surface") of the wavefront sensor in the detector 160, which are shown in FIG. 1, and calculates lengths of the respective optical paths (the length is hereinafter referred to as "an optical path length"). Next, at step S18, the calculator 180 sets a distribution (map) of the optical path lengths obtained on the sensor surface as the reference wavefront.

On the other hand, the measured wavefront is calculated as follows. First, at step S11, after the arrangement adjustment of the elements is completed, the measuring apparatus causes the laser beam 101 from the laser light source 100 to pass through the pinhole 110 and the collimator lens 120 and thereby causes a convergent light 103 to enter the object 130. Then, at this step, the calculator 180 acquires, from the detector 160, an image of interference fringes formed by a measuring light from the object 130 on the sensor surface of the detector 160 (that is, an intensity distribution of the measuring light on the sensor surface). Thereafter, at step S12, the calculator 180 analyzes the acquired interference fringes and calculates a shear wavefront as a differential wavefront (which corresponds to a first differential wavefront or a measured differential wavefront).

The shear wavefront is calculated by an FFT (Fast Fourier Transform) method. Wavefront restoration by the FFT method utilizes a characteristic of aberration which disturbs a career stripe of the interference fringe to separate the career stripe and the aberration from each other. Specifically, the calculator 180 performs a two-dimensional FFT on the interference fringes to convert them into a frequency map. Next, the calculator 180 clips only a part of the frequency map near a carrier frequency, performs coordinate transformation so that the carrier frequency becomes an origin and then performs an iFFT (inverse Fast Fourier Transform) thereon, thereby acquiring a phase term of a complex amplitude map. A phase map resulted therefrom is the shear wavefront.

Next, at step S13, the calculator 180 calculates incident angles θ of the measuring light (rays) reaching the detector 160 from the shear wavefront by using following expression (5):

$$\tan\theta = \frac{\Delta Wx}{s}\cos\phi + \frac{\Delta Wy}{s}\sin\phi \qquad (5)$$

Figure 3:
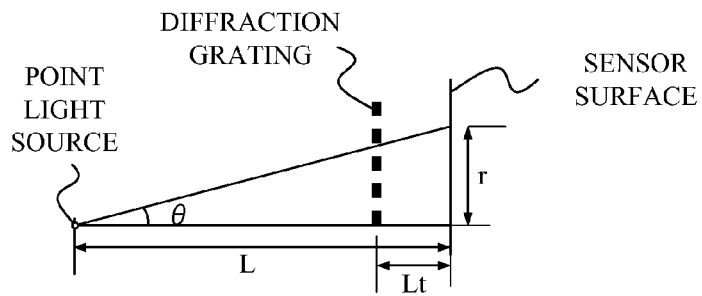
FIG. 3 schematically shows a measuring method in Embodiment 1.

-continued $$\begin{cases} \phi = \arctan(y/x) \\ \Delta Wx = W(x-s, y) - W(x, y) \\ \Delta Wy = w(x, y-s) - W(x, y) \end{cases}$$

where x and y represent coordinates on the detector 160, W represents a wavefront, ΔWx and ΔWy represent an X-shear wavefront and a Y-shear wavefront, and s represents a shear amount. Description will hereinafter be made of expression (5) for calculating the incident angles θ of the rays from the shear wavefront. FIG. 3 schematically shows a Talbot interferometer for a divergent wave. In a divergent wave system having no aberration, a period p' of interference fringes obtained on a sensor surface is expressed by following expression (6) where p represents a grating pitch p of a diffraction grating, L represents a distance from a point light source to the sensor surface, and Lt represents a distance from the diffraction grating to the sensor surface:

$$p' = \frac{L}{L - Lt} p \qquad (6)$$

Using expression (6), a frequency F of the interference fringes, the shear amount s and tan θ are respectively expressed by following expressions (7) where D represents a size of the sensor surface:

$$\begin{cases} F = \dfrac{D}{p'} \\ s = \dfrac{\lambda}{p} Lt \\ \tan\theta = \dfrac{r}{L} \end{cases} \qquad (7)$$

When regarding the wavefront as being constant in a range smaller than the shear amount, the shear wavefront ΔW can be expressed by using following expressions (8) of differential wavefronts:

$$\Delta Wr = s \frac{\partial W}{\partial r},\ \Delta Wx = s \frac{\partial W}{\partial x},\ \Delta Wy = s \frac{\partial W}{\partial y} \qquad (8)$$

where ΔWr represents a shear wavefront in an r direction, and an r-differential wavefront (∂W/∂r), an x-differential wavefront (∂W/∂x) and a y-differential wavefront (∂W/∂y) have a relation shown by following expression (9):

$$\frac{\partial W}{\partial r} = \frac{\partial W}{\partial x} \cos\varphi + \frac{\partial W}{\partial y} \sin\varphi \qquad (9)$$

In a minute area around a position at which a radius from the optical axis is r on the sensor surface, the frequency of the interference fringes can be regarded as being constant, so that the shear wavefront ΔWr can be expressed by following expression (10):

$$\Delta Wr = \left(\frac{D}{p} - F\right)\frac{r}{D}\lambda = \frac{\lambda}{p} Lt \frac{r}{L} = s\tan\theta \qquad (10)$$

Using above expressions (8) to (10) can provide expression (5).

Following steps S14 and S15 constitute a correction step. The calculator 180 calculating the incident angles θ of the rays reaching the detector 160 (sensor surface) as mentioned above calculates, at step S14, a correction amount C for the shear wavefront by using each of the incident angles θ.

The correction amount C is defined by a ratio of the differential wavefront (shear wavefront) of the measured wavefront and a differential wavefront of the reference wavefront. The calculator 180 calculates the correction amount C as follows. First, the calculator 180 calculates a relation between the differential wavefront and the incident angle for each of the measured wavefront and the reference wavefront.

The relation between the differential wavefront of the measured wavefront and the incident angle of the ray is shown by following expression (11) which is obtained from expressions (8) and (10). In expression (11), the differential wavefront of the measured wavefront is expressed by adding an index M to ∂W/∂r.

$$\left.\frac{\partial W}{\partial r}\right|_M = \tan\theta \qquad (11)$$

Figure 4:
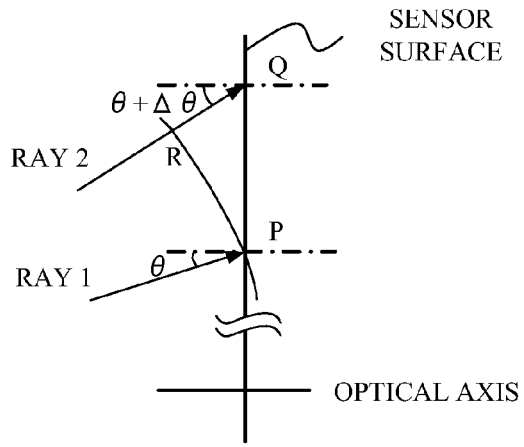
FIG. 4 schematically shows a calculation of a reference wavefront in Embodiment 1.

On the other hand, the relation between the differential wavefront of the reference wavefront and the incident angle of the ray can be calculated as follows. The differential wavefront of the reference wavefront is hereinafter expressed by adding an index S to ∂W/∂r. FIG. 4 schematically shows a method to calculate the differential wavefront of the reference wavefront.

In FIG. 4, two points P and Q are extremely close to each other on the sensor surface, and rays 1 and 2 respectively reach the points P and Q. The rays 1 and 2 respectively form angles θ and θ+Δθ with the optical axis. A point R is an intersection of an equi-phase surface passing the point P with the ray 2. The differential wavefront of the reference wavefront is expressed by following expression (12):

$$\left.\frac{\partial W}{\partial r}\right|_S = \lim_{PQ \to 0} \frac{RQ}{PQ} \qquad (12)$$

where PQ and RQ respectively represent lengths of line segments PQ and RQ.

When an angle RPQ is θ+δθ, an angle QRP is π/2+Δθ−δθ.

A relation shown by following expression (13) can be derived from a sine theorem, and the differential wavefront of the reference wavefront is obtained as expression (14) by using expressions (12) and (13).

$$\frac{RQ}{\sin(\theta + \delta\theta)} = \frac{PQ}{\sin\left(\frac{\pi}{2} + \Delta\theta - \delta\theta\right)} \qquad (13)$$

$$\left.\frac{\partial W}{\partial r}\right|_S = \lim_{PQ \to 0} \frac{RQ}{PQ} = \lim_{\substack{\Delta\theta \to 0 \\ \delta\theta \to 0}} \frac{\sin(\theta + \delta\theta)}{\sin\left(\frac{\pi}{2} + \Delta\theta - \delta\theta\right)} = \sin\theta \qquad (14)$$

The correction amount C is calculated, by using the differential wavefront of the measured wavefront and the differential wavefront of the reference wavefront, as a ratio thereof as shown by following expression (15). In this case, the correction amount C is a direction cosine of the incident angle θ of the ray. A reason for changing the correction amount C depending on the incident angle θ of the ray is because a large difference between the reference object and the object 130 causes a difference between the incident angle of the ray calculated from the reference wavefront and the incident angle of the ray obtained when measuring the object 130, thereby causing an error of the correction amount C.

$$C = \frac{\frac{\partial W}{\partial r}\big|_S}{\frac{\partial W}{\partial r}\big|_M} = \cos\theta \tag{15}$$

Next, at Step S15, the calculator 180 performs, on the measured shear wavefront (first differential wavefront), a correction process depending on the incident angle θ of the measuring light to the sensor surface to calculate a corrected shear wavefront (second differential wavefront) which is a shear wavefront after the correction process. Specifically, the calculator 180 multiplies the measured shear wavefront by the correction amount C to calculate the corrected shear wavefront. In this embodiment, since the incident angle θ is expressed by expression (5), the corrected shear wavefront is expressed by following expression (16):

$$\begin{cases} C\Delta Wx = \cos\theta \Delta Wx = \dfrac{1}{\sqrt{1+\tan^2\theta}}\Delta Wx = \dfrac{\Delta Wx}{\sqrt{1+\left(\dfrac{\Delta Wx}{s}\cos\phi + \dfrac{\Delta Wy}{s}\sin\phi\right)^2}} \\ C\Delta Wy = \cos\theta \Delta Wy = \dfrac{1}{\sqrt{1+\tan^2\theta}}\Delta Wy = \dfrac{\Delta Wy}{\sqrt{1+\left(\dfrac{\Delta Wx}{s}\cos\phi + \dfrac{\Delta Wy}{s}\sin\phi\right)^2}} \end{cases} \tag{16}$$

When the incident angle θ is small, the corrected shear wavefront may be expressed by using following expression (17):

$$\begin{cases} C\Delta Wx \sim \left(1 - \dfrac{1}{2}\left(\dfrac{\Delta Wx}{s}\cos\phi + \dfrac{\Delta Wy}{s}\sin\phi\right)^2\right)\Delta Wx \\ C\Delta Wy \sim \left(1 - \dfrac{1}{2}\left(\dfrac{\Delta Wx}{s}\cos\phi + \dfrac{\Delta Wy}{s}\sin\phi\right)^2\right)\Delta Wy \end{cases} \tag{17}$$

The correction amount C can be expressed by using cos θ, tan θ or the measured value of the shear wavefront. Each of these cos θ, tan θ and measured value of the shear wavefront is a function of the incident angle θ. For this reason, "the incident angle" used to calculate the correction amount C depending on the incident angle at step S14 includes not only θ, but also functions of the incident angle such as cos θ, tan θ and the measured value of the shear wavefront.

Following steps S16 and S19 constitute a wavefront aberration calculation step. At step S16, the calculator 180 performs an integration process on the corrected shear wavefront to calculate a measured wavefront. The integration process may be performed by a generally known path integration or a fitting using a difference function of precalculated functions. For example, when the wavefront aberration is calculated as coefficients of a Zernike polynomial, fitting can be performed on the corrected shear wavefront by using a Zernike function of a difference between the polynomial and a polynomial laterally shifted therefrom by the shear amount. Moreover, at this step, other generally known integration processes may be performed.

Finally, at step S19, the calculator 180 calculates the wavefront aberration as a difference between the measured wavefront calculated at step S16 and the reference wavefront calculated at step S18. Then, the calculator 180 outputs the calculated wavefront aberration and ends this process.

The process described above enables calculating the wavefront aberration of the object 130 with a high accuracy from the measured wavefront and the reference wavefront.

Although this embodiment described the method in which the calculator 180 calculates the reference wavefront by the ray tracing, the reference wavefront may be calculated by directly measuring the optical path lengths by using a low coherence interferometer.

Moreover, in this embodiment, using the Talbot interferometer as the measuring system enables measuring the transmitted wavefront having a large aberration. The Talbot interferometer is one type of lateral shearing interferometers each measuring a difference between the transmitted wavefront and a transmitted wavefront laterally shifted (sheared) therefrom as interference fringes. Therefore, the lateral shearing interferometer can be said as a measuring system to calculate an amount corresponding to a tilt of the transmitted wavefront. The lateral shift amount of the transmitted wavefront is called as the shear amount. Decreasing the shear amount enables measuring a large aberration of the transmitted wavefront as a small aberration (shear wavefront) to such an extent that the interference fringes do not become dense.

In the shearing interferometer, a too small shear amount generally causes a shear wavefront to be buried in noise and thereby decreases accuracy, so that a proper shear amount is desirable to be approximately 3 to 5% of a diameter of a pupil. However, in this embodiment, in order to measure a transmitted wavefront having a large aberration as a small shear wavefront, it is desirable that the shear amount be 1.5% or less of the pupil diameter, and more desirably be a smaller amount such as approximately 0.3 to 0.9%. The shear amount "shear" is defined by using following expression (18) where $Z_t$ represents a distance between the diffraction grating 150 and the detector 160, and $D_i$ represents a diameter of interference fringe data on the detector 160:

$$\text{shear} = \frac{\lambda Z_t}{p D_i} \tag{18}$$

Expression (18) can be also expressed as following expression (19) by using expression (4) and a diameter $D_0$ of a light flux on the diffraction grating 150.

$$\text{shear} = \frac{2mp}{D_0} \tag{19}$$

The above expression shows that the shear amount is proportional to the grating pitch p of the diffraction grating 150. As understood from expression (4), the grating pitch of the diffraction grating also affects the distance $Z_t$ between the diffraction grating 150 and the detector 160, so that it is necessary that the grating pitch be decided in consideration of interference of the elements. For example, when m is 0.5 and $D_0$ is approximately 10 to 20 mm, the grating pitch is desirable to be approximately 40 to 180 μm.

Embodiment 2

Figure 5:
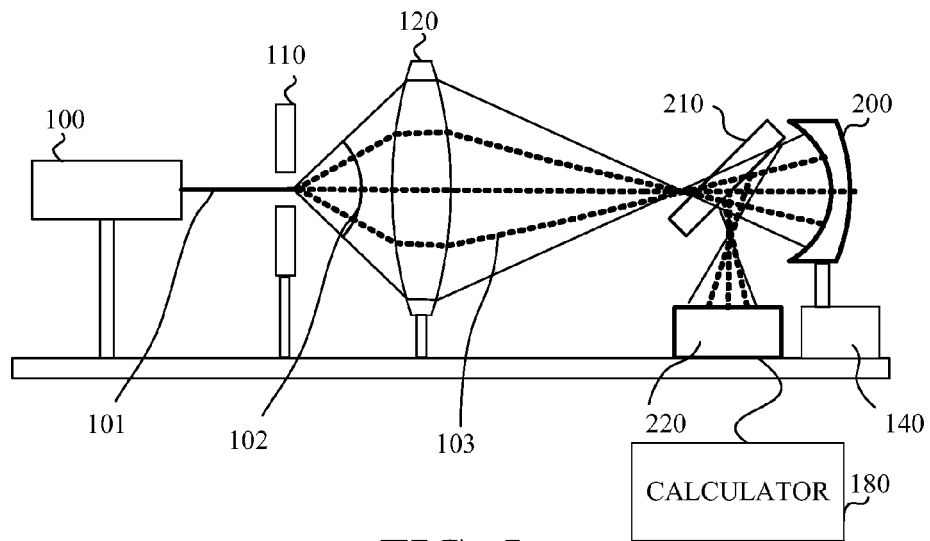
FIG. 5 shows a configuration of a wavefront aberration measuring apparatus that is Embodiment 2 of the present invention.

FIG. 5 shows a configuration of a wavefront aberration measuring apparatus that is a second embodiment (Embodiment 2) of the present invention.

In FIG. 5, constituent components of the measuring apparatus of this embodiment common to those of the measuring apparatus of Embodiment 1 (FIG. 1) are denoted by same reference numerals as those in Embodiment 1. In this embodiment, a Shack-Hartmann sensor is used as a detector 220 to measure the wavefront, and description will be made of a wavefront aberration measuring method when measuring a surface shape of an object 200.

Figure 6:
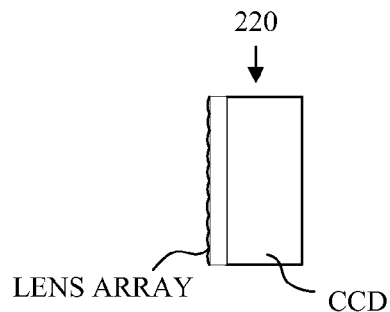
FIG. 6 shows a Shack-Hartmann sensor.

When a surface to be measured of the object 200 is a concave surface, the object 200 is placed behind a focusing point of the collimator lens 120 to cause a divergent wave to reach the surface. Then, a reflected wave (measuring light) reflected by the surface is reflected toward the detector 220 by a half mirror 210. The Shack-Hartmann sensor used as the detector 220 is constituted by a lens array and a CCD as shown in FIG. 6.

Figure 7:
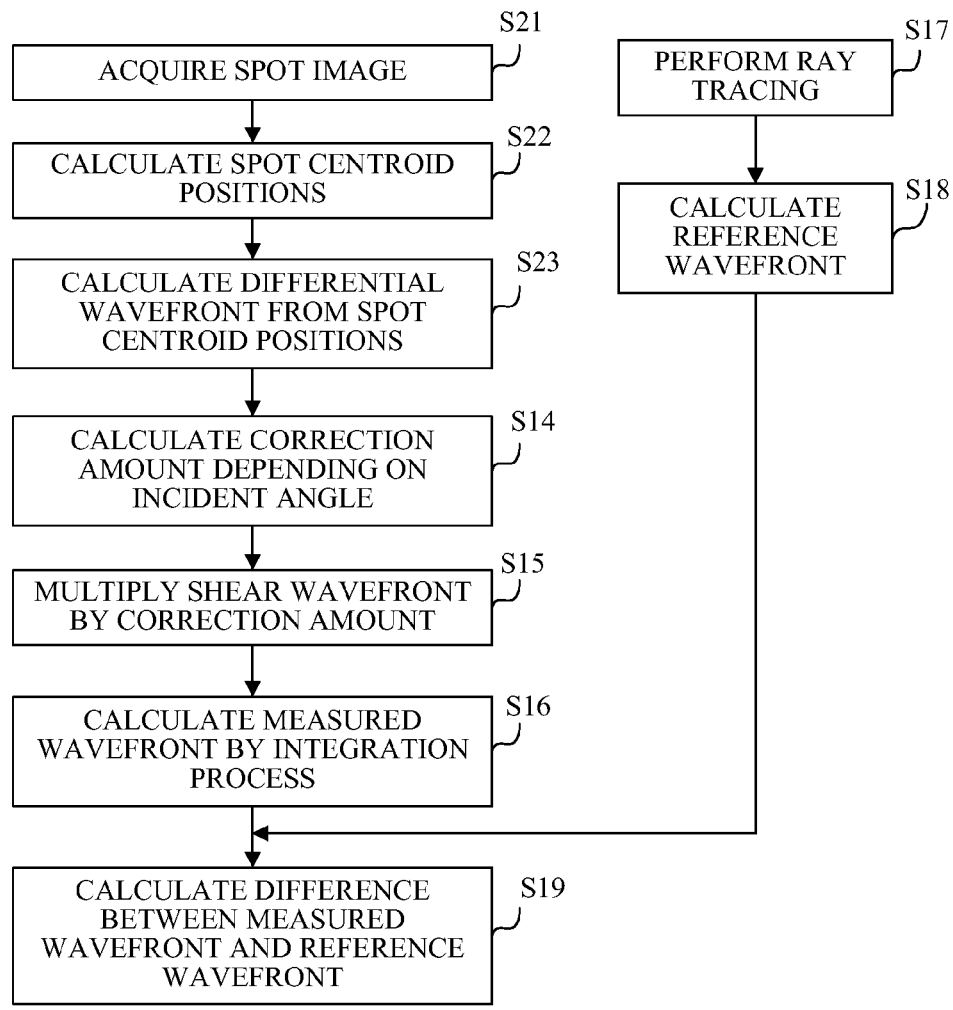
FIG. 7 is a flowchart showing a procedure to calculate a wavefront aberration in Embodiment 2.

FIG. 7 is a flowchart showing a procedure of a process (wavefront aberration measuring method) to calculate a wavefront aberration of the object 200 by using an image captured by the detector 220. A calculator (computer) 180 shown in FIG. 5 performs this calculation process according to a computer program. The flowchart of FIG. 7 includes steps S14 to S19 same as those in the flowchart of Embodiment 1 (FIG. 2) and different steps S21 to S23 from steps S11 to S13 in the flowchart of Embodiment 1, so that description will hereinafter be mainly made of these steps S21 to S23.

At step S21, the calculator 180 acquires, by using the Shack-Hartmann sensor 220, an image of an optical image formed by the reflected wave from the object (surface to be measured) 200, that is, an intensity distribution of the measuring light. In the Shack-Hartmann sensor 220, focused light spot images formed by lens cells of the lens array are formed on a light-receiving surface (sensor surface) of the CCD. Therefore, the captured image is an image in which focused light spots whose number corresponds to that of the lens cells of the lens array are assembled.

Next, at step S22, the calculator 180 calculates a centroid position (hereinafter referred to as "a spot centroid position") of each focused light spot.

Next, at step S23, the calculator 180 calculates, from the calculated spot centroid positions, incident angles θ of rays (measuring light) to the sensor surface and a differential wavefront. When f represents a focal length of the lens array of the Shack-Hartmann sensor 220, and is represents a distance between the calculated spot centroid position and a spot centroid position in a case of causing a collimated light to enter the Shack-Hartmann sensor 220, the incident angle θ and the differential wavefront (∂W/∂x and ∂W/∂y) are expressed by following expressions (20) where θx and θy respectively represent an x component and a y component of the incident angle θ.

$$\begin{cases} \tan\theta = \dfrac{ls}{f} \\ \dfrac{\partial W}{\partial x} = \theta x \\ \dfrac{\partial W}{\partial y} = \theta y \end{cases} \quad (20)$$

Thereafter, the calculator 180 performs the processes at step S14 and steps subsequent thereto to finally calculate the wavefront aberration of the object 200 with a high accuracy.

Embodiment 3

Figure 8:
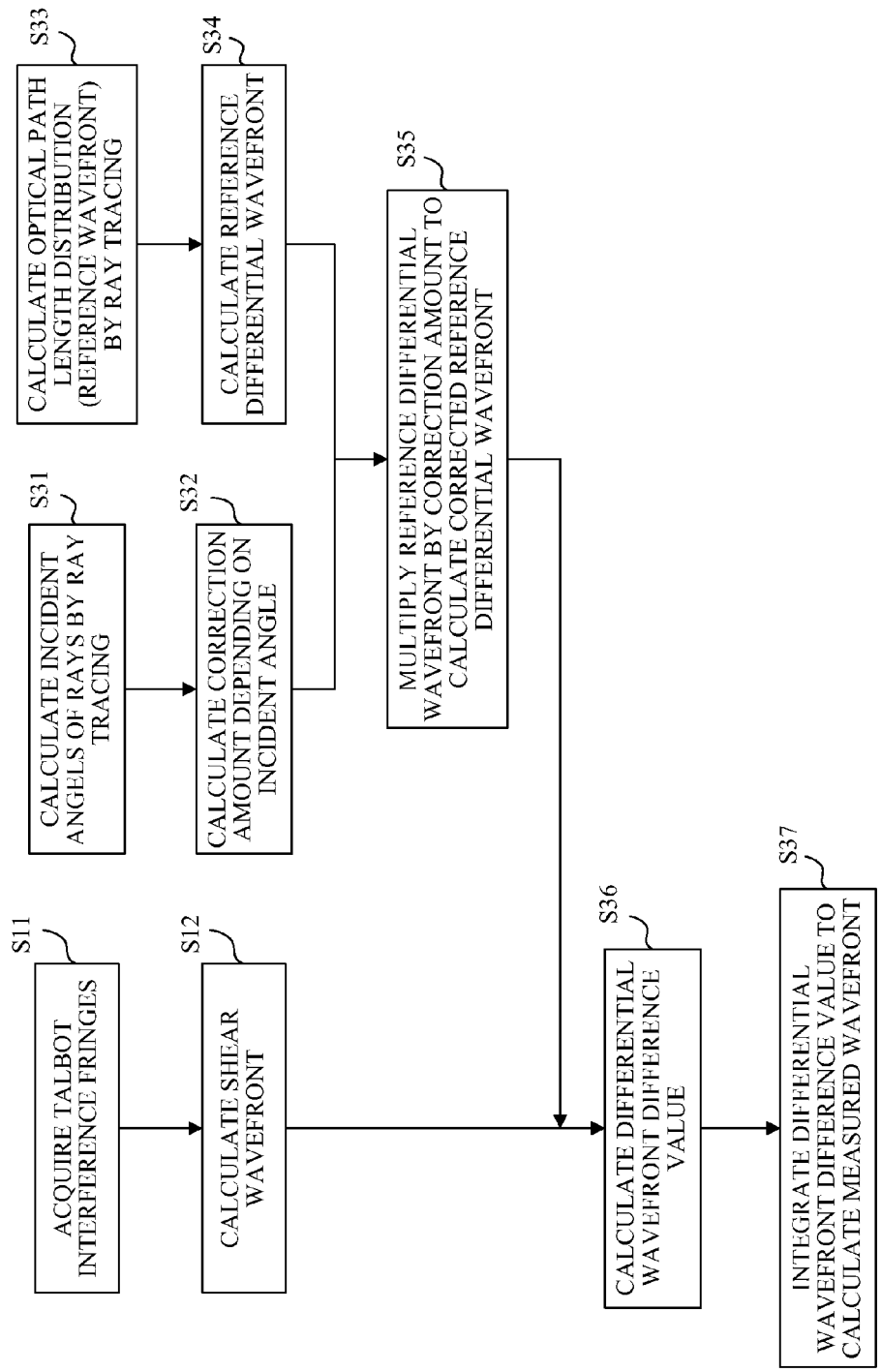
FIG. 8 is a flowchart showing a procedure to calculate a wavefront aberration in Embodiment 3.

Next, description will be made of a third embodiment (Embodiment 3) of the present invention. When the difference between the reference wavefront and the measured wavefront is small, the correction amount C described in Embodiment 1 can be acquired, not by calculation using the measured differential wavefront, but completely only by calculation. FIG. 8 is a flowchart showing a procedure of a calculation process to calculate a wavefront aberration (wavefront aberration measuring method), which is performed in such a case. The calculator (computer) 180 shown in FIG. 1 (or FIG. 5) also performs this calculation process according to a computer program. The calculator 180 serves as a measured differential wavefront calculator, a reference differential wavefront calculator, a corrector and a wavefront aberration calculator. Since steps S11 and S12 in the flowchart of FIG. 8 are same as those in the flowchart of Embodiment 1 (FIG. 2), their description is omitted.

Initially, the shape and location of the reference object are set, and locations identical to those of the elements (including the reference object in place of the object 130) in the measuring apparatus shown in FIG. 1 are input to the calculator 180. At step S31, the calculator 180 performs ray tracing for a plurality of optical paths of rays of the reference light exiting from the pinhole 110 to the sensor surface of the detector 160, which are shown in FIG. 1, and calculates incident angles θ of the rays from ray tracing information of the respective optical paths. Then, at step S32, the calculator 180 calculates the correction amount C from the incident angle θ as well as at step S14 in Embodiment 1. This step S32 and step S35 mentioned below constitute a correction step.

On the other hand, at step S33, the calculator 180 performs the ray tracing as well as at step S31 to calculate an optical path length distribution, that is, a reference wavefront. Then, at step S34, the calculator 180 calculates a reference differential wavefront (first reference differential wavefront) as a differential value of the reference wavefront. The differential value of the reference wavefront may be calculated by using the incident angles θ calculated at step S31 or may be calculated by using differences of the optical path lengths of the optical paths adjacent to each other among the plurality of optical paths whose distribution were calculated at step S32.

Next, at step S35, the calculator 180 performs, on the first reference differential wavefront calculated at step S34, a correction process depending on the incident angle θ of the measuring light to the sensor surface to calculate a corrected reference differential wavefront (second reference differential wavefront) which is a reference differential wavefront after the correction process. Specifically, the calculator 180 multiplies the first reference differential wavefront by the correction amount C to calculate the corrected reference differential wavefront.

Next, at step S36, the calculator 180 calculates a differential wavefront difference value showing a difference between the shear wavefront calculated at step S12 and the corrected reference differential wavefront calculated at step S35. Then, at step S37, the calculator 180 performs the integration process as well as at step S16 in Embodiment 1 on the differential wavefront difference value to calculate a measured wavefront. Thereafter, at step S19 described in Embodiment 1, the calculator 180 calculates the wavefront aberration as the difference between the measured wavefront calculated at step S37 and the reference wavefront calculated at step S18 to output it, and then ends this process.

Also in this embodiment, an accurate wavefront aberration of the object 130 can be acquired from the measured wavefront and the reference wavefront.

A combination of the procedures described in this embodiment (Embodiment 3) and Embodiment 1 or 2 may be used to calculate the wavefront aberration. Specifically, the calculator 180 may calculate the incident angle from the reference wavefront as described in Embodiment 3 and perform the correction process depending on the incident angle on the measured differential wavefront as described in Embodiments 1 and 2. Moreover, the calculator 180 may calculate the incident angle from the measured differential wavefront as described in Embodiments 1 and 2 and perform the correction process using the incident angle on the reference differential wavefront as described in Embodiment 3.

Embodiment 4

Figure 9:
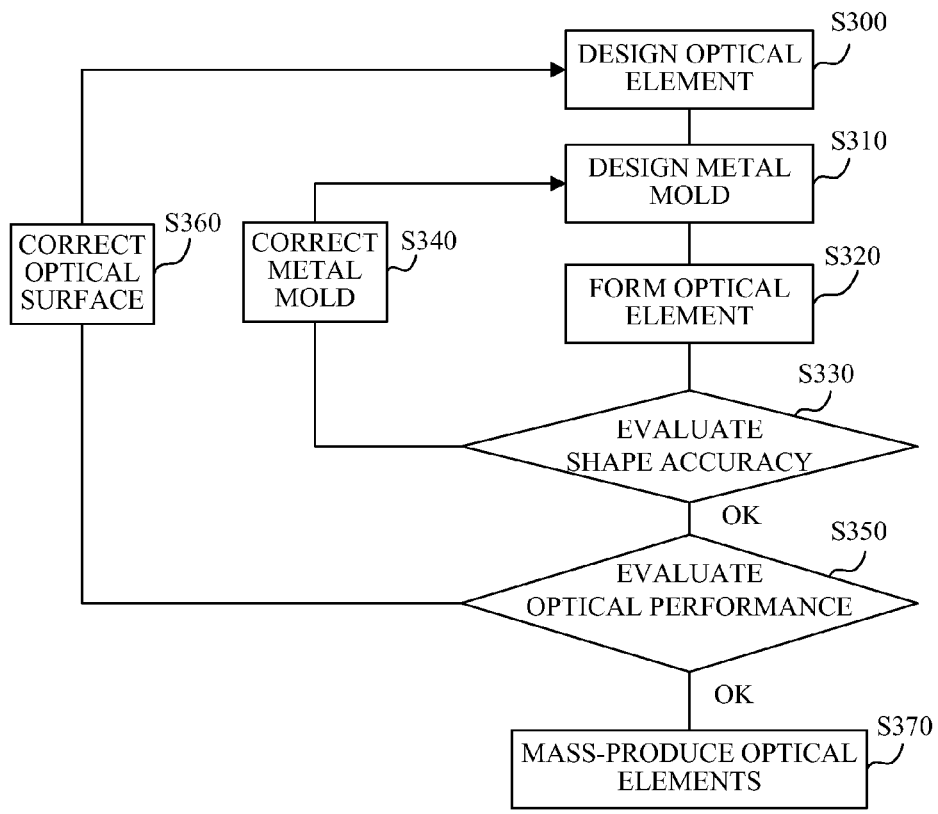
FIG. 9 is a flowchart showing a manufacturing process to manufacture an optical element by using the wavefront aberration acquired in each embodiment, which is Embodiment 4 of the present invention.
Figure 10:
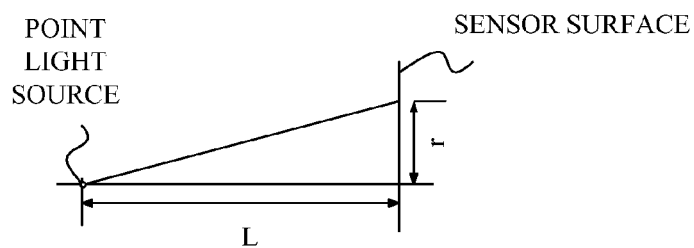
FIG. 10 shows an optical path length.

It is possible to feed back the measurement result acquired by the measuring apparatus (or the measuring method) described in each of Embodiments 1 to 3 to manufacturing of optical elements such as lenses. FIG. 9 shows an example of a manufacturing method of the optical element using mold forming.

In FIG. 9, step S300 is a step to design the optical element. In this step, a designer designs the optical element by using optical design software or the like.

Step S310 is a step to design and process, on a basis of the optical element designed at step S300, a metal mold to be used for the mold forming of the optical element by using a glass material or a plastic material.

Step S320 is a step to perform the mold forming of the optical element by using the metal mold processed at step S310.

Step S330 is a step to measure a shape of the optical element formed at step S320 and evaluates its accuracy. When the shape evaluated at step S330 does not satisfy a required shape accuracy, a correction amount of the metal mold is calculated at step S340, and a corrected metal mold is again processed at step S310.

Step S350 is a step to evaluate optical performance of the optical element satisfying the required shape accuracy at step S330. At this step, the wavefront aberration of the optical element as the object (in addition, a surface shape of its optical surface) is measured by using the measuring apparatus described in any one of Embodiments 1 to 3, and other optical characteristics are measured. When the optical performance evaluated at this step does not satisfy a required specification, a correction amount of the optical surface is calculated at step S360, and the optical element is again designed by using its result at step S300.

Step S370 is a step to mass-produce the optical elements under a manufacturing condition of the optical element realizing the desired optical performance at step S350.

The wavefront aberration of the optical element can be measured with a high accuracy by the measuring method described in each of Embodiments 1 to 3, which enables mass-production of the optical elements having good optical performance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-063405, filed Mar. 26, 2013 which is hereby incorporated by reference herein in its entirety.

What is claimed is:

1. A wavefront aberration measuring method comprising the steps of:
    measuring an intensity distribution of a measuring light transmitted through or reflected by an object to be measured, using a light-receiving sensor;
    calculating a first differential wavefront, which is a differential wavefront of the measuring light on the light-receiving sensor;
    calculating a second differential wavefront by performing a correction process on the first differential wavefront depending on a distribution of an incident angle of the measuring light to the light-receiving sensor; and
    calculating a wavefront aberration of the object using the second differential wavefront.

2. A wavefront aberration measuring method according to claim 1, further comprising the step of:
    acquiring a reference wavefront, which is a wavefront of a reference light on the light-receiving sensor, the reference light being transmitted through or reflected by a reference object having a reference shape for that of the object,
    wherein the wavefront aberration is calculated using a difference between a wavefront obtained by integrating the second differential wavefront and the reference wavefront.

3. A wavefront aberration measuring method according to claim 1, further comprising the step of:
    acquiring a reference differential wavefront, which is a differential wavefront of a reference light on the light-receiving sensor, the reference light being transmitted through or reflected by a reference object having a reference shape for that of the object,
    wherein the wavefront aberration is calculated by integrating a difference between the second differential wavefront and the reference differential wavefront.

4. A wavefront aberration measuring method according to claim 1, wherein the distribution of the incident angle is expressed by a function of the incident angle.

5. A wavefront aberration measuring method according to claim 4, wherein the function of the incident angle is a direction cosine of the incident angle.

6. A wavefront aberration measuring method according to claim 1, wherein the object is an optical element having an aspheric surface.

7. A wavefront aberration measuring method comprising the steps of:
    measuring an intensity distribution of a measuring light transmitted through or reflected by an object to be measured, using a light-receiving sensor;

calculating a measured differential wavefront, which is a differential wavefront of the measuring light on the light-receiving sensor;

calculating a first reference differential wavefront, which is a differential wavefront of a reference light on the light-receiving sensor, the reference light being transmitted through or reflected by a reference object having a reference shape for that of the object;

calculating a second reference differential wavefront by performing a correction process on the first reference differential wavefront depending on a distribution of an incident angle of the reference light to the light-receiving sensor; and calculating a wavefront aberration of the object using the second reference differential wavefront and the measured differential wavefront.

8. A wavefront aberration measuring method according to claim 7, wherein the wavefront aberration is calculated by integrating a difference between the second reference differential wavefront and the measured differential wavefront.

9. A wavefront aberration measuring method according to claim 7, wherein the distribution of the incident angle is expressed by a function of the incident angle.

10. A wavefront aberration measuring method according to claim 9, wherein the function of the incident angle is a direction cosine of the incident angle.

11. A wavefront aberration measuring method according to claim 7, wherein the object is an optical element having an aspheric surface.

12. A manufacturing method of an optical element, the method comprising the steps of:

forming the optical element;

measuring an intensity distribution of a measuring light transmitted through or reflected by an object to be measured, using a light-receiving sensor;

calculating a first differential wavefront, which is a differential wavefront of the measuring light on the light-receiving sensor;

calculating a second differential wavefront by performing a correction process on the first differential wavefront depending on a distribution of an incident angle of the measuring light to the light-receiving sensor;

calculating a wavefront aberration of the object using the second differential wavefront; and evaluating the optical element using the wavefront aberration.

13. A manufacturing method of an optical element, the method comprising the steps of:

forming the optical element;

measuring an intensity distribution of a measuring light transmitted through or reflected by an object to be measured, using a light-receiving sensor;

calculating a measured differential wavefront, which is a differential wavefront of the measuring light on the light-receiving sensor;

calculating a first reference differential wavefront, which is a differential wavefront of a reference light on the light-receiving sensor, the reference light being transmitted through or reflected by a reference object having a reference shape for that of the object;

calculating a second reference differential wavefront by performing a correction process on the first reference differential wavefront depending on a distribution of an incident angle of the reference light to the light-receiving sensor;

calculating a wavefront aberration of the object using the second reference differential wavefront and the measured differential wavefront; and evaluating the optical element using the wavefront aberration.

14. A wavefront aberration measuring apparatus comprising:

a measurer configured to measure an intensity distribution of a measuring light transmitted through or reflected by an object to be measured, using a light-receiving sensor;

a differential wavefront calculator configured to calculate a first differential wavefront, which is a differential wavefront of the measuring light on the light-receiving sensor;

a corrector configured to calculate a second differential wavefront by performing a correction process on the first differential wavefront depending on a distribution of an incident angle of the measuring light to the light-receiving sensor; and a wavefront aberration calculator configured to calculate a wavefront aberration of the object using the second differential wavefront.

15. A wavefront aberration measuring apparatus comprising:

a measurer configured to measure an intensity distribution of a measuring light transmitted through or reflected by an object to be measured, using a light-receiving sensor;

a measured differential wavefront calculator configured to calculate a measured differential wavefront, which is a differential wavefront of the measuring light on the light-receiving sensor;

a reference differential wavefront calculator configured to calculate a first reference differential wavefront which is a differential wavefront of a reference light on the light-receiving sensor, the reference light being transmitted through or reflected by a reference object having a reference shape for that of the object;

a corrector configured to calculate a second reference differential wavefront by performing a correction process on the first reference differential wavefront depending on a distribution of an incident angle of the reference light to the light-receiving sensor; and a wavefront aberration calculator configured to calculate a wavefront aberration of the object using the second reference differential wavefront and the measured differential wavefront.

* * * * *